United States Patent Office
3,078,740
Patented Feb. 26, 1963

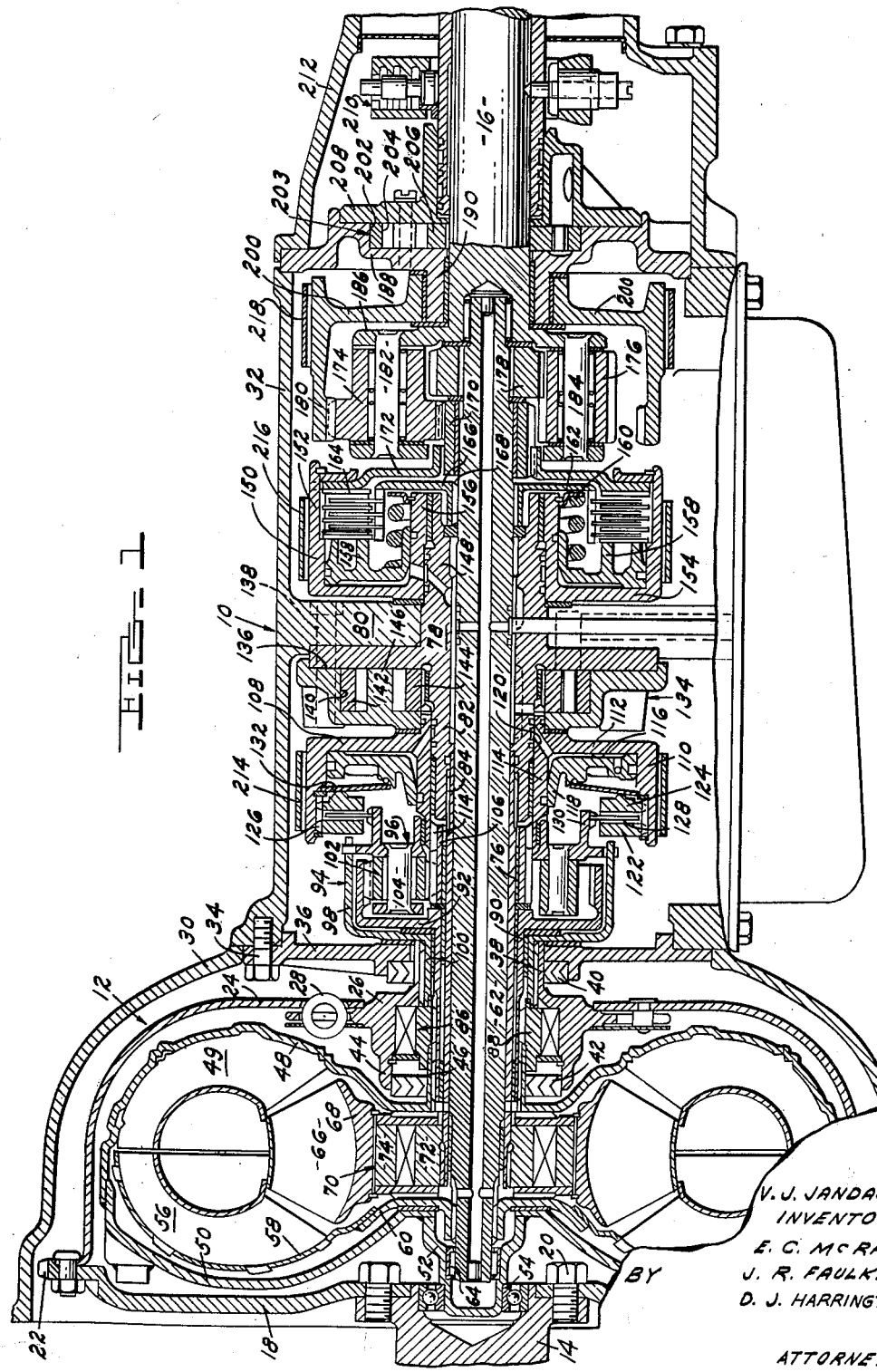

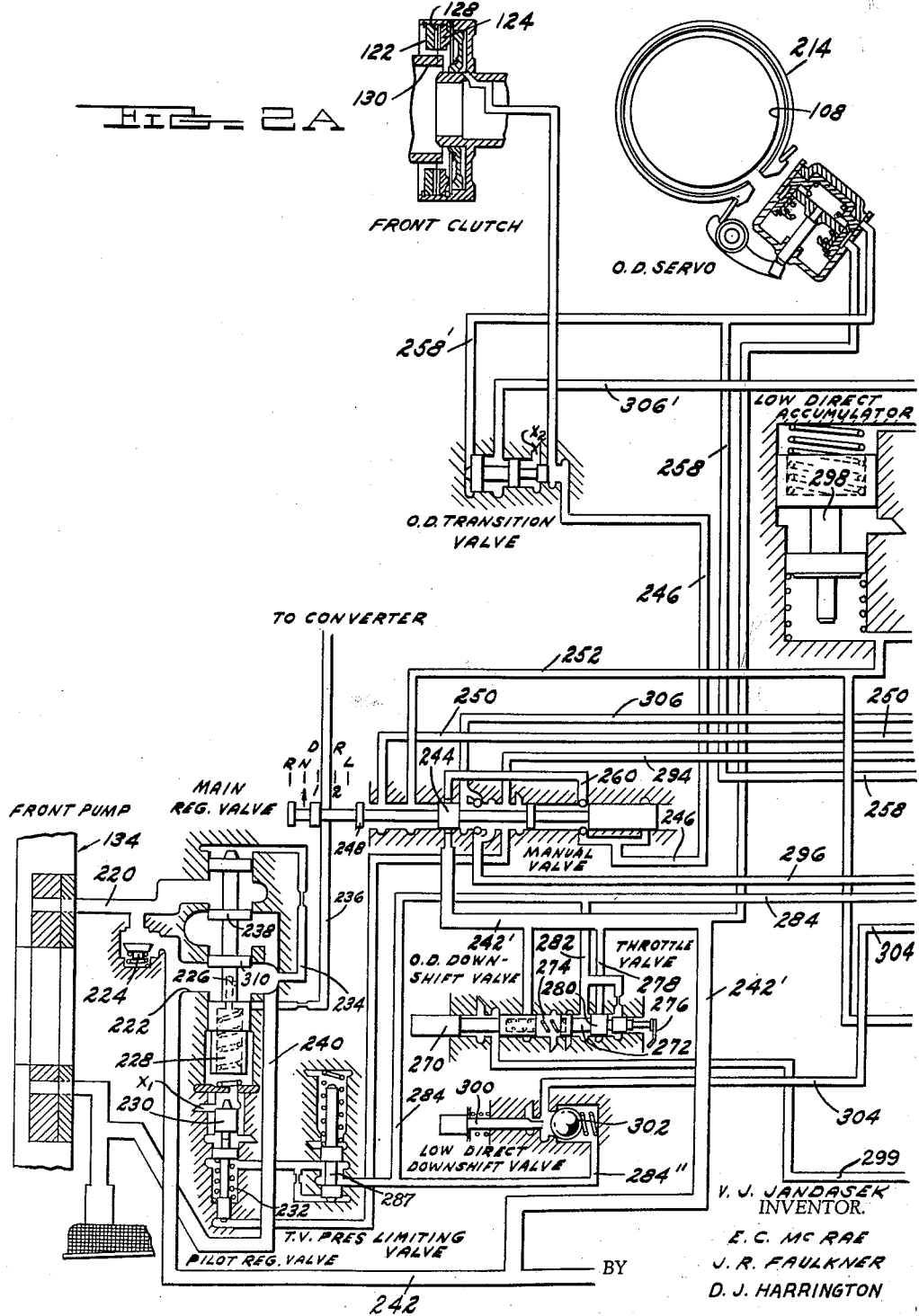

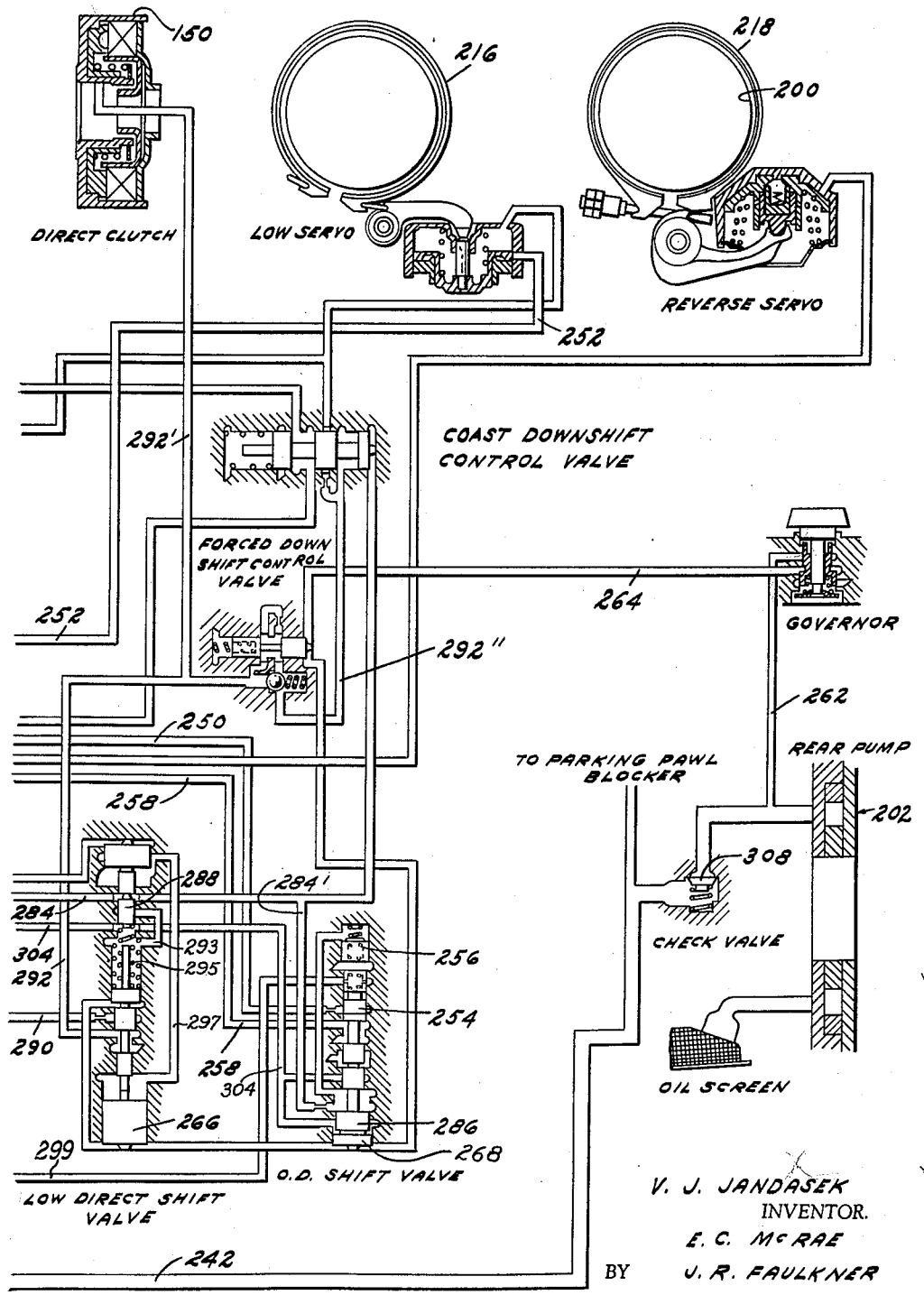

3,078,740
AUTOMATIC TRANSMISSION
Vladimir J. Jandasek, Dearborn, Mich., assignor to Ford Motor Company, Dearborn, Mich., a corporation of Delaware
Filed Aug. 29, 1956, Ser. No. 606,897
10 Claims. (Cl. 74—733)

My invention relates generally to a power transmission mechanism capable of transmitting driving power from a power source such as a vehicle engine to a driven member such as the traction wheels of a wheeled vehicle. More particularly, my invention relates to a new and improved automatic, multiple speed transmission for automotive vehicles or the like and to a unique control means for controlling the relative motion of the movable gear elements thereof to effect changes in the torque multiplication ratio during operation of the transmission.

I am aware of various automatic power transmission mechanisms which include compounded gear elements and automatic control means for selectively energizing various transmission clutch and brake means associated with the gear elements to control the relative motion thereof, said control means including a fluid control valve circuit having one or more shift valve elements for directing fluid pressure to an appropriate portion of the circuit thereby energizing the clutch and brake means in a proper sequence to establish a desired shift pattern. The shift valve elements respond to variations in an engine load signal and in a vehicle speed signal so that the proper transmission speed ratio exists for any given set of driving conditions. The fluid pressure source often includes two separate positive displacement fluid pumps, one of the pumps being powered by the vehicle engine and the other being drivably coupled to a driven portion of the transmission mechanism. The control valve circuit further includes a regulator valve mechanism capable of utilizing the fluid delivery pressure of the pumps to maintain an established control pressure in the control valve circuit, said control pressure being utilized by the clutch and brake means during operation. During forward drive operation at relatively low vehicle speeds the engine driven pump supplies fluid to the control circuit as above mentioned, and as the vehicle speed increases, the discharge pressure of the tail shaft driven pump increases proportionately. At a predetermined ratio of the vehicle speed and the engine speed for a given engine throttle setting, the discharge pressure and capacity of the tail shaft driven pump is sufficiently large to meet the pressure requirements of the control circuit. A check valve is provided for blocking the discharge passage for the engine driven pump when this predetermined speed ratio is reached and thereafter the fluid supplied by the engine driven pump is bypassed into the exhaust portion of the circuit, the aforementioned regulator valve being adapted to accommodate this bypassing action. At high engine speeds the volume of fluid circulated through the bypass passage is quite large and this pumping action requires an appreciable amount of the gross horsepower made available by the engine. Since the engine driven pump performs no useful function after the tail shaft driven pump takes over the full pumping requirements of the circuit, it merely detracts from the overall operating efficiency of the transmission mechanism. It also aggravates the oil cooling problem since the energy required to circulate fluid through the front pump is absorbed by the fluid in the form of heat.

According to a principal feature of my invention, I have provided a new and improved transmission structure having fluid pressure operated gear control elements and a fluid control valve circuit for automatically and selectively energizing the various control elements to obtain a desired shift sequence, said control circuit including a front engine driven pump and a rear tail shaft driven pump as above described wherein the front pump is coupled drivably to an engine driven member through one of the gear subassemblies of the transmission. The various valve elements of the circuit are arranged so that one of the gear elements of the above mentioned subassemblies may be braked during a shift into a preselected gear ratio during operation, the speed ratio between the front and rear pumps which exists following such a shift being sufficiently large to make it possible for the rear pump to supply the entire pressure requirements of the fluid circuit. The means for accomplishing this braking action is also effective to brake simultaneously the front pump thereby rendering the same inoperative during that portion of the operating cycle when it is not required.

The provision of a transmission control mechanism of the type above described being a principal object of my invention, it is a further object of my invention to provide a new and improved automatic transmission control mechanism wherein a minimum amount of power is required to maintain a control pressure in the fluid circuit associated therewith.

It is another object of my invention to provide an automatic power transmission mechanism having a fluid pressure actuated control which incorporates a fluid pump for supplying a control pressure, said pump being operatively associated with the gear elements of the transmission mechanism so that it is operative when a certain one of the gear elements is being powered and inoperative when the same gear element is braked.

It is a further object of my invention to provide a new and improved automatic transmission control mechanism of simplified construction which may be readily adapted to be used with a variety of multiple speed transmissions and which is characterized by a high degree of operating efficiency and reliability.

Further objects and features of my invention will readily become apparent from the following description and from the accompanying drawings.

In carrying forth the foregoing objects, I have provided an automatic multiple speed transmission having planetary gear elements and clutch and brake means for controlling the relative motion of the gear elements to effect the various transmission speed ratios, one of the ratios of the presently disclosed embodiment of my invention being an overdrive. A hydrokinetic unit is situated in the power train between the engine and the above mentioned gear elements, said unit including a turbine or runner and an impeller or pump defiining at least in part a hydrokinetic torus circuit.

The engine crankshaft is connected to the carrier member of a first planetary gear unit and the turbine member of the hydrokinetic unit is connected to the other portions of the gear assembly of the transmission. The impeller or pump member is connected to the ring gear of the first planetary unit. Means are provided for selectively braking the sun gear of the first planetary unit to provide an overspeeding of the pump member of the hydrokinetic unit with respect to the engine crankshaft. A one-way clutch device is disposed between the engine crankshaft and the impeller to accommodate this overspeeding.

A control circuit of the type previously described may be provided and the front pump thereof may be drivably coupled to the sun gear of the above mentioned first planetary unit. A brake drum member is joined to the sun gear, and by preference it forms a portion of the connection between the sun gear and the front pump. A brake band may encircle the brake drum and it may be applied when braking of the sun gear is desired. When the sun gear is so braked an overdrive is accomplished through the first planetary unit and the front pump is rendered inoperative. It is contemplated that the rear pump of the control circuit will have sufficient capacity during this overdrive operation to supply the entire fluid pressure requirements of the circuit. Other clutch and brake means are provided for controlling the motion of the remaining planetary gear portions of the mechanism to produce additional ratios which may be compounded with the ratios obtainable with the first planetary unit to produce the desired overall ratio.

For the purpose of more particularly describing the principal features of my instant invention, reference will be made to the accompanying drawings wherein:

FIGURE 1 shows a cross sectional assembly view of a multiple speed automatic transmission embodying the unique control means of my invention;

FIGURES 2A and 2B are schematic representations of a fluid control valve circuit capable of controlling the planetary gear portions of the transmission assembly of FIGURE 1, a separate portion of the circuit being shown in each of the figures.

Referring first to the assembly view of FIGURE 1, numeral 10 is used to designate generally the above described planetary gear portions of the transmission mechanism and numeral 12 is used to designate generally a hydrokinetic unit. A power input shaft, which may be the crankshaft of an internal combustion engine, is designated by numeral 14 and a power output tail shaft is designated by numeral 16, the planetary gear portion 10 and the hydrokinetic portion 12 forming a power flow path between the shafts 14 and 16.

A drive plate 18 is secured centrally to the power input shaft 14 by means of bolts 20, and the periphery of the plate 18 is formed with an external ring gear 22 capable of engaging an electric starter motor operated pinion for cranking the engine during starting. The periphery of the drive plate 18 is secured to a drive member 24 which may be coupled to a one-way clutch member 26 by means of a resilient coupling 28 of conventional construction, said coupling 28 being adapted to function as a vibration damping means and to accommodate a limited amount of restrained movement between the drive member 24 with respect to the clutch member 26.

The hydrokinetic unit 12 is enclosed within a suitable casing 30 which may be secured about its outer periphery to the cylinder block of the internal combustion engine with which the transmission is used, and the planetary gear portion 10 of the transmission mechanism is enclosed by a somewhat narrower casing 32 which may be secured to the rear of the casing 30 by suitable bolts 34. A partition wall 36 is situated at the juncture between the casings 30 and 32 and it is centrally apertured to receive an extension 38 of the clutch member 26, a suitable fluid seal 40 being positioned within the central opening for preventing oil from passing from the interior of casing 32 to the interior of casing 30. Similarly, a fluid seal member 42 may be positioned on the other side of the clutch member 26 between a seal retaining shoulder 44 and an extension 46 secured to the hub formed on the outer shroud of a pump member 49 of the hydrokinetic unit 12. The outer periphery of the pump shroud 48 may be joined to the periphery of a bell shaped support member 50, the latter being joined at the center thereof to a pilot member 52 which is adapted to be rotatably journaled in a central recess formed in the power input shaft 14, a suitable bearing 54 being provided for this purpose.

The hydrokinetic unit 12 further includes a turbine member 56 situated in juxtaposed relationship with respect to the pump member 49 and it includes an outer shroud 58 having a hub member 60 which is splined or otherwise positively secured to a central power shaft 62. By preference, the end of the shaft 62 may be rotatably journaled within the pilot member 52 by suitable bearings 64.

The hydrokinetic unit 12 further includes a reactor member 66 having a hub 68 within which is positioned a one-way brake assembly 70 having inner and outer races as indicated at 72 and 74 respectively, the inner race 72 being splined to a relatively stationary sleeve shaft 76 which extends axially to a relatively stationary adapter 78 secured to a transverse wall 80 of the transmission casing 10, said adapter 78 having an extension 82 which is connected to the sleeve shaft 76 by means of a splined connection 84.

The clutch element 26 forms a portion of the one-way clutch assembly generally designated in FIGURE 1 by numeral 86, and it includes an inner race 88 which may be splined to a sleeve 90 concentrically disposed about shafts 62 and 76. The sleeve 90 is positively joined to the hub of a ring gear member 92 of a first planetary unit generally designated in FIGURE 1 by numeral 94. The planetary unit 94 includes a carrier assembly 96 which is connected to a drum shaped drive member 98 having an axially extending sleeve 100 which forms a central hub, said sleeve 100 being splined to the clutch member 26 as indicated. The carrier assembly 96 includes a plurality of planet gears 102 rotatably journaled on individual pinion shafts 104 and concentrically positioned about the axis of the power shaft 62. The planetary pinions 102 drivably engage the internal ring gear member 92 and a centrally positioned sun gear 106, the latter being journaled on the aforementioned sleeve shaft 76 by a suitable bushing.

A brake drum member 108 is rotatably journaled on the aforementioned extension 82 of the stationary adapter 78 and it is formed with a cylindrical portion 110, a radial portion 112 and a central hub portion 114, the latter being positively splined to sun gear 106 as indicated at 114. The drum member 108 defines an annular cylinder 116 within which may be positioned an annular piston member 118, said piston member cooperating with the walls of the cylinder 116 to define a fluid working chamber to which fluid pressure may be admitted by means of a pressure passage 120 communicating with a portion of the control circuit which will subsequently be described in connection with FIGURES 2A and 2B. The inner periphery of the cylindrical portion 110 of the drum member 108 carries a pair of spaced clutch plates 122 and 124 as indicated, suitable splines being formed for this purpose on the cylindrical portion 110 and on the outer margin of the clutch plates 122 and 124 as indicated at 126. A clutch disc 128 is positioned between the clutch plates 122 and 124 and is carried by an extension 130 formed on the carrier assembly 96. A coned spring disc 132 is located between the movable piston 118 and a clutch plate 124 so that the fluid pressure force exerted on the piston 118 will be transferred to the clutch plate 124 thereby urging the latter into frictional engagement with the clutch disc 128 and clutching the carrier assembly 96 to the sun gear 106, the clutch plate 122 providing the required reaction.

The aforementioned front pump is shown in FIGURE 1 at 134 and it comprises an outer pump casing 136 secured to the transverse wall 80 of the casing 10 by means of ports 138. The casing 136 is formed with a recess 140 within which is positioned an internal pump gear 142, said recess being defined in part by the adjacent wall of the adapter 78. An external pump gear 144 is positioned in the recess 140 in driving engagement with the gear 142, the latter being eccentric with respect to the former thereby defining the crescent shaped space therebetween within which a correspondingly shaped section 146 of the casing 136 is located. Suitable intake and exhaust ports are provide for the front pump in a conventional manner although they are not illustrated in the drawing.

The adapter 78 is further formed with an extension 148 received through the central aperture formed in the transverse wall 80. A brake member 150 is rotatably supported by the extension 148 and it comprises a drum portion 152, a radial portion 154 and a hub portion 156. The brake member 150 defines an annular cylinder within which is positioned an annular piston 158 which is urged in a left hand direction by compression spring 160 interposed between the piston 158 and the spring seat 162. A multiple disc clutch assembly 164 is located adjacent the movable piston 158 and it is comprised of a series of clutch discs positively splined to the inner periphery of the cylindrical portion 152 of the brake member 150. A series of alternately spaced brake discs are carried by a clutch member 166 which is splined to the central power shaft 62 as indicated at 168. A planetary sun gear 170 is rotatably journaled on the power shaft 62 and it is positively coupled to an end plate 172 of the multiple disc clutch assembly. The sun gear 170 drivably engages a plurality of planet gears 174 which are in turn intermeshed with alternately spaced planet gears 176, the latter drivably engaging a planetary sun gear 178 and the former drivably engaging a ring gear 180. The planet pinions 174 and 176 are rotatably journaled on pinion shafts 182 and 184, respectively, which in turn form a portion of the planetary carrier assembly generally designated by numeral 186. The carrier assembly 186 is in turn integrally joined to the previously mentioned power output shaft 16. A transverse end wall 188 is formed within the transmission casing 10 and it carries a support 190 on which a brake drum 200 is rotatably journaled, said brake drum 200 carrying the aforementioned ring gear 180.

The rear of the end wall 188 is recessed as shown at 202 and a positive displacement gear type pump 203 is positioned therein as indicated, said pump including an internal gear 204 and an external driving gear 206. The gears 204 and 206 are eccentrically located in driving relationship in a conventional manner and suitable intake and exhaust ports may be formed in the surrounding housing although they are not illustrated in the drawing. End plate 208 is secured to the end wall 188 and it defines one side of the pump casing for pump gears 204 and 206.

A centrifugal governor valve mechanism is illustrated at 210 and it is rotatably carried by the tail shaft 16, said governor including a radially movable valve element which is influenced by centrifugal force to provide a vehicle speed signal. The governor 210 forms a portion of the transmission control which subsequently will be described with reference to FIGURES 2A and 2B. The tail shaft 16 and the governor 210 are enclosed by a rear transmission casing 212 which may be joined to the rear of the casing 32 as illustrated.

In addition to the disc type clutch assemblies previously described, the relative motion of the planetary gear elements may be controlled by three brake bands illustrated at 214, 216 and 218, the band 214 encircling the drum portion 110 of the brake portion 108, the band 216 encircling the drum portion 152 of the brake member 150 and the band 218 encircling the drum 200. These brake bands may be applied selectively by fluid pressure operated brake servos.

The transmission structure as illustrated in FIGURE 1 may be conditioned for low speed operation by engaging the front clutch and the center brake band 216 while the remaining clutch and brake elements remain de-energized. It will thus be apparent that power will be delivered from the engine crankshaft 14 to the converter pump 49 through the drive plate 18, through the drive member 24 and through the one-way clutch 86. The rotating pump 49 creates a fluid circulation in the converter torus circuit thereby imparting a drive torque to the turbine member 56 which is transferred to the power shaft 62 and the sun gear 178. The sun gear 170 will remain stationary and the carrier 186 will be driven in the same direction as the direction of the rotation of the sun gear 178 at a reduced speed ratio.

To condition the transmission mechanism for direct drive or second speed operation, the front and rear clutches are both energized and the center brake band is de-energized, the other two brake bands remaining de-energized as before. It will thus be apparent that sun gear 170 will be locked to sun gear 178 through the rear multiple disc clutch assembly and the power transferred to the turbine member 56 by the pump member 49 of the converter will be transferred to the power shaft 62 and to the power output shaft 16 with a one-to-one driving ratio.

To condition the transmission for overdrive operation the front clutch is de-energized and the front brake band is energized while the rear clutch remains energized and the center and rear brake bands remain de-energized as before. It will thus be apparent that power will be transferred from the engine crankshaft 14 to the carrier member 96 of the front planetary unit through the drive member 98 and through the clutch member 26. Since the sun gear 106 of the front planetary unit is braked by the brake band 214, the ring gear member 92 of the front planetary unit will overspeed the carrier 96. It is thus apparent that the converter pump 49 will be driven by the engine crankshaft 14 with an overdrive speed ratio. The power thus delivered to the turbine member 56 will be transferred to the power shaft 62 and to the tail shaft 16 as in direct drive operation, the overall speed ratio of the transmission being equal to the overdrive ratio of the front planetary unit. The one-way clutch 86 is capable of accommodating an overspeeding of the sleeve 90 and the inner clutch race 88 with respect to the clutch member 26 during this overdrive operation but it prevents an overspeeding of the clutch member 26 with respect to the inner race 88.

During direct drive and low speed operation, the clutch member 26 and the inner race 88 will turn as a unit since power will be delivered directly through the one-way clutch 86. The elements of the front planetary unit 94 will turn also as a unit since the ring gear unit 92 and carrier member 96 assume the speed of the race 88 and the clutch member 26 respectively to prevent an overspeeding of the sun gear 106 and the planet elements 102 of the front planetary unit 104 during deceleration. The carrier member 96 is clutched to the sun gear 106 by means of the disc clutch assembly 122, 124 and 128 during low speed and direct drive operation although it does not form a portion of the power flow train of the transmission.

To effect reverse drive the front clutch and the rear brake band are both energized while the rear clutch and the front and center brake bands are de-energized. It is thus seen that power will be transferred through the one-way clutch 86 to the pump member 49 which drives the turbine member 56 and the power shaft 62. The power is then transmitted through the planetary gears 178, 176 and 174 to the planetary carrier 186 and the power output shaft 16. Since the ring gear 180 is held stationary by the reverse brake band 218 the carrier 186 will be driven in a reverse direction.

It is thus seen that brake band 214 is energized only when the transmission mechanism is operated in overdrive and since the driving gear 144 of the front pump 134 is drivably coupled to the brake member 108, the front pump is operative only during operation in the low and high speed ranges and in reverse, but it is inoperative during overdrive operation.

For the purpose of very briefly describing the functions of the principal elements of the control valve circuit, reference will be made to FIGURES 2A and 2B wherein numeral 220 is used to designate the front pump discharge passage which extends to the inlet opening 222 of the main regulator valve through a one-way check valve 224. The main regulator valve comprises a multiple land valve spool slidably disposed in a cooperating valve chamber, said valve element including a flow metering orifice 226 for admitting fluid pressure to the chamber 228 situated at the lower end of the valve spool, said chamber 228 accommodating a valve spring which urges the regulator valve element in an upward direction.

The chamber 228 of the main regulator valve communicates with the upper end of the pilot regulator valve chamber within which is slidably positioned a pilot regulator valve element 230 which controls the degree of communication between the pilot regulator valve chamber and a communicating exhaust port designated by the symbol "$X_1$." The pilot regulator valve element is urged in an upward direction by the pilot regulator valve spring 232 against the opposing force due to the fluid pressure acting on the upper end thereof. When the front pump discharge pressure increases up to a value which approaches the desired control pressure, the pilot regulator valve 230 opens the adjacent exhaust port thereby permitting a circulation of fluid through a flow metering orifice 226 and the chamber 228. This flow through the orifice 226 creates a pressure differential thereacross which is transmitted to opposed sides of the main regulator valve element, a passage 234 extending to the upper side of the valve element for this purpose. At some predetermined pressure differential, a converter fluid supply passage 236 will be uncovered by an adjacent valve land of the main regulator valve element to permit the converter to become charged with a charge pressure sufficient to accommodate the transfer of torque from a converter pump member 49 to the turbine member 56 and to establish a converter torus flow. Upon a further build up in pressure differential across the orifice 226, the land 238 will uncover its adjacent valve seat to permit communication between the pump discharge passage 220 and a bypass passage 240 extending to the intake side of the front pump 134. It is thus seen that the pump discharge pressure will be regulated at a predetermined value and any increase in the speed of the front pump will be accompanied by an increase in the bypass flow, but there will be no corresponding increase in the discharge pressure. It will further be apparent that the magnitude of the pressure level at which the main regulator valve will function will be determined by the characteristics of the pilot regulator valve.

The regulated control pressure is supplied to control pressure passage 242 which extends to the manual valve through a communicating control pressure passage 242'. The manual valve comprises a multiple land valve element capable of assuming any of a plurality of positions relative to the valve chamber with which it cooperates to condition the transmission for the various drive ranges. If it is assumed that the manual valve element is shifted to a neutral position designated in FIGURE 2A by letter "N," the land 244 of the manual valve element will prevent control pressure from reaching the various pressure passages of the circuit although control pressure will be allowed to pass to the overdrive clutch through pressure passage 246 to maintain the front clutch in engagement whenever the vehicle engine and the front pump are operating. Since control pressure is prevented from reaching the direct drive clutch and the servos associated with the three brake bands, the various planetary elements of the transmission mechanism will be free to rotate without an accompanying torque transfer therethrough.

When the manual valve element is shifted to the drive range position designated by numeral "D-1," the valve land 248 will close the end of the valve chamber associated with the manual valve element and control pressure will be transferred through the manual valve chamber from passage 242' to passages 250 and 252, the latter extending to the apply side of the low speed servo and the former extending to the overdrive shift valve which includes a movable valve element having a valve land 254 adapted to block the passage 250 when the valve element assumes a downward position under the influence of the overdrive shift valve spring 256.

As will subsequently be explained, the overdrive shift valve assumes an upward position during overdrive operation thereby causing passage 250 to communicate with passage 258 extending to the apply side of the overdrive servo. On the other hand, if the manual valve assumes the drive position designated by the numeral "D-2," passage 250 will be opened to exhaust thereby making it impossible for the passage 258 and the apply side of the overdrive servo to become pressurized with control pressure. It is thus apparent that the overdrive speed range may be either eliminated or included in the automatic shift sequence as desired depending upon the drive range position which the vehicle operator chooses. For purposes of demonstrating the operation of the control valve circuit, it will be assumed that the manual valve element is shifted to drive range position "D-1" and it will be assumed that the vehicle is accelerating from a dead start to a relatively high road speed for various throttle settings.

When the manual valve element assumes a first drive position, regulated control pressure is transferred from passage 242' to passage 252 thus energizing the low speed servo and causing brake band 216 to brake the brake member 150. Simultaneously, fluid pressure is transferred to branch passage 260 which communicates through the manual valve with the previously mentioned passage 246 extending to the front clutch which locks the carrier member 96 to the sun gear 106 of the front planetary unit to prevent overspeeding of the elements of the planetary units during engine braking. Since the transmission is thus conditioned for low speed operation, power will be transferred to the traction wheels of the vehicle and the vehicle will accelerate thus causing the rear pump 203 and the tail shaft mounted governor to function. Pressurized fluid is supplied to the governor by the rear pump 202 through passage 262 and speed governor pressure is delivered from the governor through a passage 264 which communicates with the lower end of the low direct shift valve and the lower end of the overdrive shift valve to urge the same in an upward direction against the opposing force of the respective shift valve springs, the low direct shift valve and the overdrive shift valve being provided with appropriate valve land 266 and 268, respectively on which governor pressure is caused to act.

Referring next to the throttle valve as illustrated in FIGURE 2A it is seen that it comprises a pair of valve plungers 270 and 272, the former being acted on by the conventional engine throttle linkage. A throttle valve spring 274 is interposed between the valve elements 270 and 272 for exerting a force on the valve element 272 which is proportional to the degree of engine throttle opening. A suitable spring element 276 may be employed for urging the valve element 272 in the opposite direction. Regulated control pressure is supplied to the throttle valve through passage 278 and the degree of communication between passage 278 and the throttle valve chamber is controlled by a throttle valve land 280 as illustrated. A throttle pressure passage 282 communicates with the throttle valve chamber and is adapted to deliver throttle pressure to throttle pressure passage 284 extending to one side of the coast downshift valve, to a branch passage 284' extending to the upper side of the overdrive shift valve land 286 and to the spring chamber on the upper side of the overdrive shift valve. Throttle pressure passage 284 further communicates with the upper side of the low direct shift valve land 288, the force exerted on the low direct shift valve and the overdrive shift valve by the throttle pressure opposing the force exerted by the governor pressure. Land 288 is biased upwardly by a separate spring 295 and it reduces the effective pressure level of the throttle pressure in passage 284. The reduced throttle pressure is transferred to the valve spring chamber through passage 293. It is thus apparent that the shift valves will be actuated at various vehicle speeds depending upon the magnitude of the throttle pressure which in turn is dependent upon the engine throttle setting, the latter being an indication of the magnitude of the engine torque.

Throttle pressure is also transferred to the lower end of the pilot regulator valve through a passage 284" so that the characteristics thereof may be dependent on the engine throttle setting which in turn is an indicator of engine torque. When the engine torque is high, the pilot regulator valve causes the main regulator valve to maintain a higher control pressure in the circuit to adapt the transmission clutch and brake means to accommodate the increased torque requirements of the transmission.

The throttle valve pressure limiting valve is situated in passage 284" as shown to interrupt communication between the throttle valve and the pilot regulator valve 287 when a predetermined value for the throttle pressure is reached. When that occurs, the pressure limiting valve is urged upwardly against spring pressure and the regulated control pressure thereafter is insensitive to changes in engine throttle position at more advanced engine throttle settings.

When the vehicle accelerates to a speed which is sufficiently large to cause the low direct shift valve to move in an upward direction for a given throttle setting, pressure passage 290 will be caused to communicate with passage 292, the former communicating with the aforementioned control pressure passage 252 and the latter communicating with the direct drive clutch through branch passage 292' and with the release side of the low speed servo through branch passage 292" for the brake band 216. The transmission is thus conditioned for direct drive operation as previously explained since the direct drive clutch is thus energized and the low speed servo is released, the front clutch remaining energized as before.

Upon a further increase in vehicle speed for any given engine throttle setting the magnitude of the governor pressure will increase until the overdrive shift valve is urged in an upward direction thereby causing communication between passages 250 and 258 previously exhausted passage, the latter extending to the apply side of the overdrive servo to energize the brake band 214. Simultaneously, fluid pressure is transferred to the left side of the overdrive transition valve through a branch passage 258' to cause the transition valve to shift to the right and to block the aforementioned passage 246 thereby causing the front clutch to become de-energized. The overdrive transition valve also functions to exhaust the front clutch through an appropriately positioned exhaust port shown at "$X_2$". Since the direct drive clutch and the overdrive servo are thus simultaneously energized while the other gear control elements are de-energized, the transmission will assume overdrive operation as previously explained.

Reverse drive may be obtained by moving the manual valve element in a leftward direction to the position indicated by the letter "R" thus causing fluid pressure to be transferred from passage 242' to passage 294 which extends to the apply side of the reverse servo. Control pressure is free to pass from the branch passage 260 to the passage 246 to energize the front clutch as during direct drive and low speed operation. Control pressure is also distributed to the upper end of the low direct shift valve through a branch passage 296 thereby rendering the low direct shift valve insensitive to variations in vehicle speed. This same branch passage is pressurized when the manual valve is shifted to the low speed drive position "L." In addition, control pressure is transferred during reverse drive to the pilot regulator valve to urge the same in an upward direction to increase the control pressure level thereby adapting the transmission clutch and brake means for the increased torque reaction accompanying reverse drive operation.

The control pressure distributed to the upper end of the low direct shift valve during operation in reverse and low speed drive is transferred to the upper end of land 266 through passage 297 to supplement the other downwardly directed shift valve forces.

By preference a low direct accumulator is provided as shown in FIGURE 2A and it comprises a chamber within which is positioned a movable piston member 298, the portion of the chamber on one side of the member 298 communicating with control pressure passage 252 and the portion of the chamber on the other side of the member 298 communicating with passage 292". The accumulator serves to delay the operation of the direct drive clutch thereby preventing an undesirable sudden application of the clutch. This cushioning effect takes place regardless of the magnitude of the pressure level at which the main regulator valve is operating.

An overdrive direct down shift can be obtained by opening the engine throttle until the overdrive down shift valve allows pressure to pass from passage 242' to passage 299 which communicates with the upper side of the overdrive shift valve.

A low direct down shift can be obtained by moving the engine throttle linkage mechanism to a wide open throttle position thereby urging a plunger 300 of the low direct down shift valve in a right hand direction as viewed in FIGURE 2A to unseat a ball check valve 302 to permit throttle pressure to pass from the aforementioned throttle pressure passage 284 and the communicating branch passage 284" to a passage 304, the latter extending to the low direct shift valve and the overdrive shift valve for subjecting the same to throttle pressure thereby supplementing the biasing action of the respective throttle springs at vehicle speeds greater than a predesigned value. A down shift will occur by reason of the supplementary valve biasing force.

The forced down shift control valve operates to vary the rate of exhaust of fluid from the release side of the low speed servo piston when fluid pressure is delivered to the apply side of the same to effect a shift from direct drive into low speed operation. Since a greater time is required to accelerate the engine over a given speed range while operating at higher engine speeds than the corresponding time required to accelerate the engine while operating at lower engine speeds, the forced down shift control valve is adapted to function to restrict the pressure discharge passage when the vehicle governor pressure exceeds a predesigned value and to permit an unrestricted flow of fluid from the release side of the low speed servo when the vehicle governor pressure is below that predesigned value.

The coast down shift control valve is somewhat similar in operation to the forced down shift control valve although it responds to throttle pressure rather than governor pressure. Throttle pressure acts upon one end of the coast down shift control valve and a valve spring acts in the opposite direction. When the vehicle operator closes the throttle during coasting operation, the throttle pressure is reduced in magnitude thereby causing the coast down shift control valve to move to the right under spring pressure and to restrict partially the exhaust passage extending to the release side of the low speed servo while simultaneously allowing control pressure to pass from passage 306 to passage 306', the latter extending to the overdrive transition valve which is urged to the left by this control pressure to supplement the biasing action of the control pressure in passage 246 acting on the end of the valve.

It will be apparent from the foregoing description that the front pump 134 will be inoperative whenever the transmission shifts into overdrive. Under these conditions the capacity of the rear pump 203 is sufficient to meet the pressure requirements of the entire circuit and the aforementioned check valve 224 adjacent the discharge side of the front pump 124 will close. Also, a similar check valve 308 located at the discharge side of the rear pump 203 will open. Under certain conditions it will be possible for both of the check valves 224 and 308 to be open simultaneously. Also, it is possible for the rear pump to supply the entire pressure requirements of the circuit although the overdrive up shift has not occurred. However, for purposes of the present discussion these special operating conditions need not be considered.

When check valve 308 opens and check valve 224 closes, the valve land 310 on the main regulator valve will become unseated from its associated valve seat thereby causing pressurized fluid to bypass from passage 242 to passage 240. The valve land 310 therefore functions in a manner similar to the aforementioned valve land 238 to maintain the desired control pressure level. The front pump 134 is rendered inoperative during this overdrive operation by the overdrive brake band 216 as previously explained. Therefore fluid circulation from passage 220 around the valve land 238 to bypass passage 240 will therefore cease and no useless dissipation of energy will take place after the need for the front pump no longer exists.

Having thus described a preferred embodiment of my invention, what I claim and desire to secure by United States Letters Patent is:

1. In a multiple speed power transmission mechanism for use with an engine, a driving member, a driven member, a plurality of gear elements drivably connecting said driving and driven members, clutch and brake means for controlling the relative motion of said gear elements to effect variations in the transmission gear ratio, said clutch and brake means including a mechanical brake adapted to selectively hold one of said gear elements stationary, fluid pressure operated actuators adapted to energize said clutch and brake means, a control valve circuit including a first pump, a second pump drivably connected to said driven member, and conduit structure interconnecting said actuators and said pumps including control valve elements for selectively distributing fluid pressure to various portions of said circuit to sequentially energize said actuators and to establish a predetermined shift sequence, said mechanical brake thereby being energized during operation in one gear ratio said first pump being drivably connected to said one gear element.

2. In a multiple speed power transmission mechanism for use with an engine, a driving member, a driven member, a plurality of gear elements drivably connecting said driving and driven members, clutch and brake means for controlling the relative motion of said gear elements to effect various transmission gear ratios including a mechanical brake adapted to selectively hold one of said gear elements stationary, fluid pressure responsive actuators for energizing said clutch and brake means, a control valve circuit including a first and a second fluid pressure pump, the latter being drivably connected to said driven member, said control valve circuit including conduit structure connecting said first and second pumps with said actuators for energizing the same, said first fluid pressure pump being drivably connected to said one gear element, and means for delivering engine power to another of said gear elements, said pumps being adapted to supply said circuit with fluid pressure and said one gear element being braked during operation in one gear ratio thereby rendering said first pump inoperative while the second pump supplies the entire pressure requirements of the circuit.

3. In a multiple speed power transmission having a plurality of gear elements forming a power flow path between a driving member and a driven member, and fluid pressure responsive clutch brake control means for regulating the relative motion of said gear elements including a mechanical brake adapted to selectively hold one of said gear elements stationary, a first fluid pressure pump drivably connected to said one gear element, a second fluid pressure pump drivably connected to said driven member, and conduit structure interconnecting said pumps and said gear control means, said mechanical brake thereby being effective to anchor said one gear element to effect a predetermined transmission speed ratio and to simultaneously render said first pump inoperative.

4. In a multiple speed power transmission mechanism for delivering power from a driving member to a driven member, a plurality of gear elements defining in part a power flow path between said driving and driven members, a first fluid pressure pump, a second fluid pressure pump drivably coupled to said driven member, fluid pressure responsive means for controlling the relative motion of said gear elements including a brake mechanism for braking one of said gear elements to condition said transmission for a predetermined gear ratio, said first fluid pressure pump being drivably connected to said one gear element, a control valve circuit interconnecting said pumps and said motion controlling means, said first pump thereby being rendered inoperative when said brake mechanism is energized while said second pump simultaneously supplies the pressure requirements of said circuit during operation of said transmission mechanism in said predetermined gear ratio.

5. In a multiple speed power transmission mechanism for delivering power from a driving member to a driven member, a plurality of gear elements defining in part a power flow path between said driving and driven members, a first fluid pressure pump, a second fluid pressure pump drivably coupled to said driven member, fluid pressure responsive means for controlling the relative motion of said gear elements including a brake mechanism for braking one of said gear elements to condition said transmission for a predetermined speed ratio, a control circuit interconnecting said pumps and said motion controlling means, said first pump being drivably connected to said one gear element whereby said brake mechanism renders said first pump inoperative when said transmission operates in said predetermined speed ratio.

6. A multiple speed power transmission mechanism for transferring power from a driving member to a driven member comprising a first planetary unit having a sun gear, a planet gear and carrier assembly and a ring gear, said planet gear and carrier assembly being drivably connected to said driving member, fluid pressure operated brake means for selectively braking said sun gear, a second planetary unit having one portion thereof connected to said driven member, means for connecting another portion of said second planetary unit to said ring gear, a first fluid pressure pump drivably connected to said sun gear, a second fluid pressure pump drivably connected to said driven member, and conduit structure interconnecting said pumps and said brake means, said first pump thereby being rendered inoperative when said brake means is energized.

7. A multiple speed power transmission mechanism comprising a driving member and a driven member, a hydrokinetic torque transmitting unit including a pump member and a turbine member, a train of gear elements interposed between said hydrokinetic unit and said driven member and forming a power delivery path, said gear train including a first planetary unit having a sun gear, a ring gear and a planet gear and carrier assembly, said driving member being connected to said carrier assembly, said ring gear being connected to said pump member, a portion of said gear train forming a driving connection between said turbine member and said driven member, pressure responsive means for controlling the relative motion of said gear elements to obtain various gear reduction ratios including a brake adapted to selectively brake said sun gear, a first and a second fluid pump drivably connected to said sun gear and said driven member respectively, a fluid circuit interconnecting said fluid pumps and said pressure responsive means including valve means for selectively distributing fluid pressure to various portions of said circuit, said first pump thereby being rendered inoperative when said brake mechanism is energized.

8. A multiple speed power transmission mechanism comprising a hydrokinetic torque transmitting unit with a pump member and a turbine member, a driving member and a driven member, a pair of planetary gear units, each of said pair of gear units including a sun gear, a ring gear and a planet gear and carrier assembly, said driving member being drivably connected to the planet gear and carrier assembly of one of said gear units, the ring gear of said one gear unit being connected to said pump member, said turbine member being drivably connected to a portion of the other of said pair of gear units, another portion of said other gear unit being drivably connected to said driven member, fluid pressure responsive means for controlling the relative motion of said gear elements including a brake mechanism operatively associated with the sun gear of said one gear unit and adapted to selectively brake the same, a first fluid pressure pump, a second fluid pressure pump drivably connected to said driven member, and a fluid circuit including shift valve elements interconnecting said fluid pumps and said motion controlling means, said shift valve elements being adapted to distribute fluid pressure within said circuit to selectively energize separate portions of said motion controlling means including said brake mechanism to obtain various transmission speed ratios, said first fluid pump being drivably coupled to the sun gear of said first planetary unit.

9. A multiple speed power transmission mechanism comprising driving and driven members, a plurality of gear elements forming power delivery paths between said members, each path having a separate driving speed ratio, fluid pressure operated servo means for controlling the relative motion of one of said gear elements relative to another to condition selectively said mechanism for operation in one speed ratio, means for energizing said motion controlling means including separate pressure sources and means for connecting one of said sources to said one gear element whereby said one source is rendered inoperative during operation of said mechanism in a first of said speed ratios and operative during operation of said mechanism in a second of said speed ratios.

10. A multiple speed power transmission mechanism comprising driving and driven members, a plurality of gear elements having power delivery paths between said members, each path having a separate driving speed ratio, fluid pressure operated means for braking selectively one of said gear elements to condition said mechanism for operation in one of a plurality of predetermined transmission speed ratios, and a fluid pressure source including separate pump means for pressurizing said motion controlling means, one of said pump means being drivably connected to said one gear element whereby said one pump means is rendered inoperative during operation of said mechanism in a first of said speed ratios and operative during operation thereof in a second of said speed ratios.

References Cited in the file of this patent
UNITED STATES PATENTS

| | | |
|---|---|---|
| 2,592,538 | Burtnett | Apr. 15, 1952 |
| 2,612,791 | Miller et al. | Oct. 7, 1952 |
| 2,655,054 | Kelley | Oct. 13, 1953 |
| 2,875,643 | Kelley | Mar. 3, 1959 |
| 2,893,261 | Flinn | July 7, 1959 |
| 3,023,636 | Kelley et al. | Mar. 6, 1962 |